(12) United States Patent
Hamilton

(10) Patent No.: US 10,353,486 B1
(45) Date of Patent: Jul. 16, 2019

(54) PASSWORD HELP USING COLOR KEYS

(71) Applicant: Nancy E. Hamilton, Gilbert, AZ (US)

(72) Inventor: Nancy E. Hamilton, Gilbert, AZ (US)

(*) Notice: Subject to any disclaimer, the term of this patent is extended or adjusted under 35 U.S.C. 154(b) by 47 days.

(21) Appl. No.: 15/150,431

(22) Filed: May 10, 2016

Related U.S. Application Data

(63) Continuation-in-part of application No. 14/120,531, filed on Jul. 26, 2014, now abandoned.

(51) Int. Cl.
*G06F 3/02* (2006.01)
*G06F 21/46* (2013.01)
*G06F 3/023* (2006.01)

(52) U.S. Cl.
CPC ............ *G06F 3/0219* (2013.01); *G06F 3/023* (2013.01); *G06F 21/46* (2013.01)

(58) Field of Classification Search
None
See application file for complete search history.

(56) References Cited

U.S. PATENT DOCUMENTS

| | | | | |
|---|---|---|---|---|
| 7,739,615 B2 * | 6/2010 | Pearson | ............... | B41J 2/2052 345/168 |
| 7,844,825 B1 * | 11/2010 | Neginsky | ............... | G06F 21/83 713/184 |
| 8,638,939 B1 * | 1/2014 | Casey | ............... | G06F 21/36 380/277 |
| 9,009,814 B1 * | 4/2015 | Wertz | ............... | G06F 21/46 713/168 |
| 2004/0104943 A1 * | 6/2004 | Kamasaki et al. | ..... | G06F 3/0219 715/773 |
| 2005/0268104 A1 * | 12/2005 | Sugishita | ............... | H04N 1/0035 713/176 |
| 2010/0011318 A1 * | 1/2010 | Nakada | ............... | G03G 15/5016 715/808 |
| 2010/0134244 A1 * | 6/2010 | Yoshida | ............... | G05B 19/048 340/5.81 |
| 2010/0333197 A1 * | 12/2010 | Wang | ............... | G06F 21/36 726/19 |
| 2011/0066975 A1 * | 3/2011 | Kim | ............... | G06F 21/36 715/810 |
| 2012/0068935 A1 * | 3/2012 | Mutoh | ............... | H04N 1/00411 345/168 |
| 2012/0159592 A1 * | 6/2012 | Griffin | ............... | G06F 21/36 726/7 |
| 2012/0167201 A1 * | 6/2012 | Maeda | ............... | H04N 1/00474 726/17 |

(Continued)

FOREIGN PATENT DOCUMENTS

WO WO 2007/104116 A2 * 9/2007
WO WO 2011/124267 A1 * 10/2011 ............. H04L 29/06

*Primary Examiner* — Christopher A Revak

(57) ABSTRACT

Additional computer keys inserted on a computer keyboard that would be in the primary colors; red, blue, and yellow and the achromatic colors; black and white when typed or held down with an alphabetical, numerical, or alpha character create complicated passwords. When there is a combination of primary colors typed together they create the secondary colors; purple orange, and green. And when the primary and secondary colors are typed with the achromatic colors black and white they create lighter and darker shades. When additional keys are typed with the various combinations they form complicated passwords that are used to keep information on a computer private and secure.

15 Claims, 16 Drawing Sheets

(56) References Cited

U.S. PATENT DOCUMENTS

| | | | | |
|---|---|---|---|---|
| 2013/0047236 A1* | 2/2013 | Singh | ............... | H04L 63/08 |
| | | | | 726/7 |
| 2013/0111581 A1* | 5/2013 | Griffin | ............... | G06F 21/31 |
| | | | | 726/19 |
| 2013/0265740 A1* | 10/2013 | Lee | ............... | H01H 13/83 |
| | | | | 362/23.03 |
| 2013/0265741 A1* | 10/2013 | Lee | ............... | H01H 13/83 |
| | | | | 362/23.03 |
| 2014/0077708 A1* | 3/2014 | Lin | ............... | H05B 37/02 |
| | | | | 315/158 |
| 2014/0123274 A1* | 5/2014 | Chen | ............... | G06F 21/46 |
| | | | | 726/18 |
| 2014/0132521 A1* | 5/2014 | Shellshear | ............... | G06F 3/02 |
| | | | | 345/168 |
| 2014/0195974 A1* | 7/2014 | Ballard | ............... | G06F 21/36 |
| | | | | 715/825 |
| 2014/0317723 A1* | 10/2014 | Hicks | ............... | G06F 21/36 |
| | | | | 726/19 |
| 2014/0317724 A1* | 10/2014 | Hicks | ............... | G06F 21/36 |
| | | | | 726/19 |
| 2014/0359300 A1* | 12/2014 | Shirakawa | ............... | G06F 21/36 |
| | | | | 713/183 |
| 2014/0380463 A1* | 12/2014 | Chen | ............... | G06F 21/46 |
| | | | | 726/18 |
| 2015/0355776 A1* | 12/2015 | Govindarajeswaran | ............... | |
| | | | | G06F 3/0416 |
| | | | | 345/173 |
| 2016/0065562 A1* | 3/2016 | Guo | ............... | H04L 63/083 |
| | | | | 726/5 |
| 2017/0286723 A1* | 10/2017 | Zhou | ............... | G06F 21/46 |

\* cited by examiner

= R
Red

= B
Blue

= Y
Yellow

= B
Black

= W
White

R + B + W = P
Light Purple

R + Y + W = O
Light Orange

B + Y + W = Gn
Light Green

FIG. 6

R + Bl = R
Dark Red

Y + Bl = Y
Dark Yellow

B + Bl = B
Dark Blue

FIG. 7

R + W = R
Light Red

Y + W = Y
Light Yellow

B + W = B
Light Blue

Bl + W = Gr
Gray

| A | + | Y | = | A
Yellow Letter |

| 6 | + | Y | = | 6
Yellow Number |

| * | + | Y | = | 
Yellow Alpha Character |

FIG. 11

[F] + [R] = F
Red Letter

[5] + [B] = 5
Blue Number

[!] + [Y] = |
Yellow Alpha Character

[9] + [Bl] = 9
Black Number

[9] + [W] = 9
White Number

[$] + [Bl] + [W] = $
Gray Alpha Character

FIG. 12

[C] + [R] + [B] = C
Purple Letter

[6] + [R] + [Y] = 6
Orange Number

[#] + [B] + [Y] = #
Green Alpha Character

[C] + [R] + [B] + [Bl] = C
Dark Purple
Letter

[6] + [R] + [Y] + [Bl] = 6
Dark Orange
Number

[#] + [B] + [Y] + [Bl] = #
Dark Green
Alpha Character

FIG. 15

[J] + [Y] + [R] = J
Orange Letter

[8] + [B] = 8
Blue Number

[(] + [Y] = (
Yellow Alpha
Character

[9] + [Bl] = 9
Black Number

[%] + [Bl] + [W] = %
Gray Alpha Character

[V] + [B] + [R] + [W] = V
Light Purple
Letter

FIG. 16

PASSWORD HELP USING COLOR KEYS

CROSS-REFERENCE TO RELATED APPLICATIONS

This application is a Continuation In Part Non-Provisional of application Ser. No. 14/120,531 titled "Password Help Using Color Keys" filed on 31 May, 2014

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

BACKGROUND OF THE INVENTION

Technical Field

Computers

Background Art

In today's society, the 21$^{st}$ century, the computer; its applications, programs, and documents are not safe from what is commonly known as "hackers". The people known as hackers are unscrupulous and have criminal intent. They harm technology and the world and threaten the many lives of people who use computers. A system, of what are known as passwords are commonly used to protect a person's access to a computer. These passwords can be "hacked" or figured out by these criminals. The need for a better system of creating secure passwords is paramount.

The identity of the hackers is usually unknown. They work in secret. An organization, the commonplace populace, governments, banks and other businesses are subject to attack from these people. Everyday people need the ability to protect themselves, others, and their businesses from them. Additionally, governments and banks need the same protection. An authenticated system is needed that allows the freedom to protect themselves and each other from the hackers. A trustworthy system of creating passwords using the computer is an alternative to fend off the attackers.

BRIEF SUMMARY OF THE INVENTION

The advantage of the idea is the ability to make up or create complex passwords for the computer that are more secure than current passwords that people use today. The idea is to use computer keys that are in color. The colors for the computer keys would represent the colors red, blue, yellow, black, and white. They would be placed on a computer keyboard. The location may vary on each keyboard. For instance, for the personal computer keyboard, the keys would be placed where there is existing space commonly found near the arrow keys. This is a perfect location and would fit the additional computer keys that would be in color.

These five colored keys would be used by a person who is sitting at a computer and intending to gain access to it. Usually there is a way to gain access and that is to type in a user name and password that the computer operator has for him or herself. The user name is unique to the person and usually involves their name. That may or may not be the case depending on the nature of business the person or persons has and their affiliation to the computer itself.

After a person types in their user name on a an existing computer, he or she would then type in a password that they made up. A password is generally a certain number of letters, capital or lower case, a number, or an alpha character.

With the idea to use color keys to enhance the password process, a computer operator can the feel a little more secure knowing that the new password they created may be harder to solve. The complex nature of the color keys and their use with the alphabetic, numerical, and alpha keys makes it possible for a number of variable options that did not exist before. That leaves open the window to stop or curtail others from gaining access to the information that is housed in a certain computer.

At present, the knowledge that is gained by "hacking into" a private computer is in danger. The information in certain data bases is being compromised and vital, important information is being made known. Scores of information is then known to the world and in most cases is hurting the populace. Personal, private, and propriety information is not safe. People's names, social security numbers, bank accounts, health records, and other various information about people, businesses, banks, and governments is then misused. Sometimes, then, this information is made public. That is why the need for a better, more enhanced way to create computer passwords is needed.

BRIEF DESCRIPTION OF THE SEVERAL VIEWS OF THE DRAWINGS

FIG. 6 Depicts how the secondary colors keys that are the combination of the primary colors; red, blue and yellow, keys create purple, orange, and green are held down with the white key create light purple, light orange, and light green color characters.

FIG. 7 Depicts how the primary color keys; red, blue, and yellow are typed or held down with the black key would create dark red, dark yellow, and dark blue characters.

FIG. 8 Depicts how when the primary color keys; red, blue, and yellow are held down with the white key create light red, light yellow, and light blue characters. It, also, shows when the black key is held down with the white key creates a gray color character.

FIG. 10 Depicts an example of when a blue key and a letter, number and alpha character keys are held down together and their resulting characters.

FIG. 11 Depicts an example of when a yellow key and a letter, number, and alpha character keys are held down together create their resulting characters.

FIG. 12 Depicts an example of when a letter, number and alpha character key is held down with the primary colors; red, blue, and yellow keys and their resulting characters. Also, shows an example of when a number is held down with a black and white key that create their resulting mark and when an alpha character key is held down with the black and white key to create a gray character.

FIG. 13 Depicts an example of when a letter, number, and alpha character key is held down with the primary keys; red, blue and yellow together create secondary color characters; purple, orange, and green characters.

FIG. 14 Depicts an example of when the letter "C" is typed with the two primary colors; red and blue, and the white key create a light purple "C" and when a number "6" is typed with a red and yellow key and the white key to create the secondary color orange number "6" and when the two primary colors; blue and yellow when typed with the white key create a light green alpha character, "#".

FIG. 15 Depicts an example of when a letter is typed with the primary colors; red and blue and the black key create the secondary color, dark purple letter character and when a number "6" is typed with the red and yellow and blue keys create a dark orange "6" and when a "#" when typed with the primary colors blue and yellow and the black key create a dark green "#".

FIG. 16 Depicts an example of a complicated password using color keys.

DETAILED DESCRIPTION OF THE INVENTION

Figure 1:
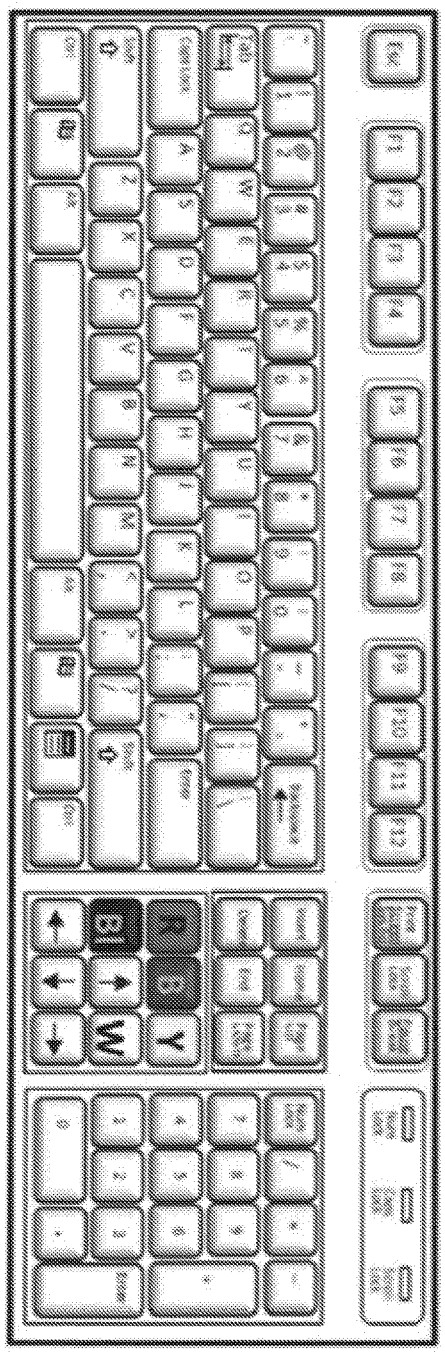
FIG. 1 Depicts a personal computer keyboard with the location of the color keys surrounding the arrow keys on it.

A new system of creating passwords for the computer includes the use of inserting five additional keys on a computer keyboard that are in color. The color keys can be typed in conjunction with the other keys on the keyboard for instance, the alphabetical, numerical, and alpha character keys. A non-limiting embodiment of the invention comprises placing these computer keys on a computer keyboard that would be in color. (FIG. 1)

Figure 2:
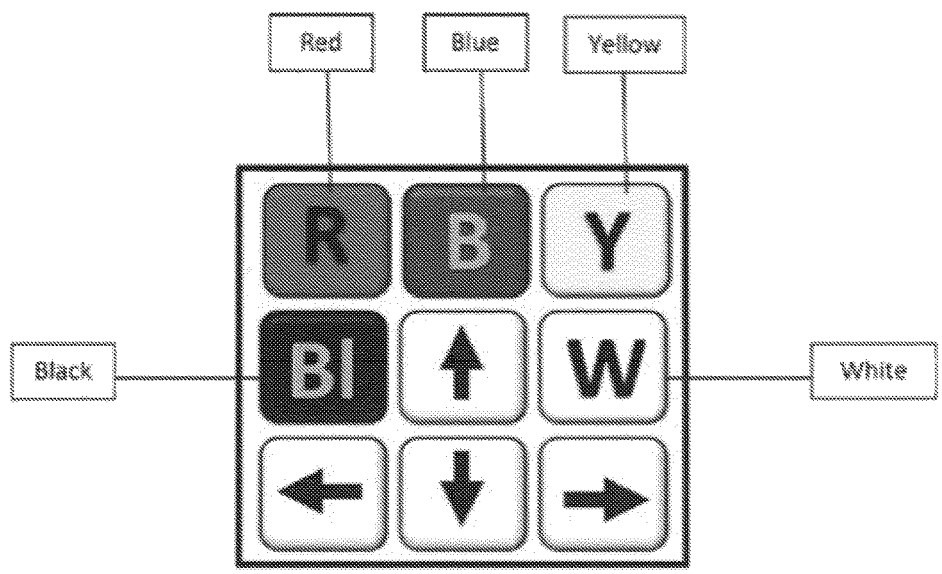
FIG. 2 Depicts another view of the color keys surrounding the arrow keys. The color keys are enhances with their corresponding first letters of their names; "R" for red, "B" for blue, "Y" for yellow, "Bl" for black, and "W" for white.
Figure 3:
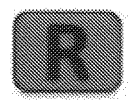
FIG. 3 Breaks down the primary colors; red, blue, and yellow and the achromatic color keys; black and white, and shows how they would look to the unseen eye.
Figure 3:
Figure 3:
Figure 3:
Figure 3:

The color keys would consist of the following colors: red, blue, yellow, black and white. The red, blue, and yellow colors are usually referred to as primary colors while the black and white colors are known as achromatic colors. The new keys would be in color and with a corresponding letter on the top of it so there is no confusion. The red key would have a letter "R" on it. The blue key would have a letter "B" on it. The yellow key would have a letter "Y" on it. The black key would have the letters "Bl" on it. The white key would have the letter "W on it." (FIG. 2) and (FIG. 3)

The color keys would be on a keyboard, be it a personal computer keyboard, (FIG. 1) or color keys in a customized location on a laptop keyboard or color keys in a customized location on a touch screen keyboard or color keys in a customized location on a hologram keyboard. The color keys on a personal computer keyboard may be placed alongside the arrow keys that are found on a personal computer keyboard already. The PC would have the additional five keys surround the existing arrow keys. These arrow keys have space next to them that is not used by any other key so the position of the new keys is perfect (FIG 2).

The action of using the color keys on the keyboard would be similar to the common way most computers can be locked and unlocked by holding down the ctrl, alt, and delete buttons; the color keys would become second nature after a few tries. The letter keys in capital or lower case, the number keys, and the alpha characters could be held down first and then the color keys could be typed and held down to the count of 1-2. The color character that is created would replace the black mark generally left by the computer. This action would make the password character. The password character that are created are then secure.

The use of the hand and the fingers is necessary. While the left hand holds down the alphabetical, numerical, or alpha character key; the right hand would hold down the color keys and their combinations to the count of 1-2. A little bit of practice is needed by the computer operator but it can be easily accomplished after a few tries.

The manner of holding down the keys to the count of 1-2 is similar to playing the piano. The half-note in music is held down for the count of 1-2. The process of holding the keys down for the count of 1-2 is necessary to the computer, itself, recognizes the action of wanting the alphabetic, numerical, or alpha character to be a color character. This new character would comprise the new password.

When a computer operator wants to create a secure password, for instance, he or she, can hold down a letter or a number or an alpha character first and then hold a color key down for the count of 1-2 to create a character in the password. The password can be any number of characters depending on the complexity the operator wants to have. The common password used today is usually 8 or more characters. When using the color keys the operator can choose at least two to begin with. A complex password may be harder to remember but would be worth it depending on the nature of the business the operator is in; for example; either for him or herself a business, a school or university, a corporation, a financial institution, or a government.

While the password is being created the operator would not be able to see the characters in color. For a less experienced computer operator, he or she can make reference to the password they created by writing the password down by using colored pencils or pens. This would enable the computer operator to have a reference to follow when the password is needed again to gain access to the computer, a document, or any other function on the computer.

The primary colors; red, blue, and yellow, could be typed alongside the alphabetical, numerical, and alpha character keys. The computer operator would first hold down the letter; either capital or lower case, the number, or the alpha character and then hold the primary color; red, blue, or yellow key down for a count of 1-2. The alphabetical, numerical, and alpha character would then be in color. (FIG. 9) (FIG. 10) (FIG. 11) (FIG. 12)

Figure 4:
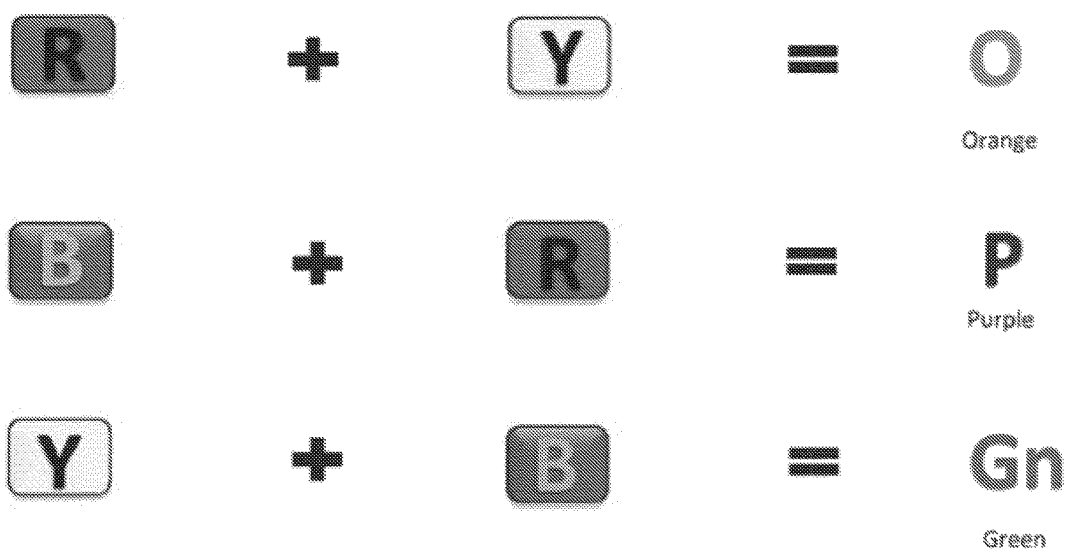
FIG. 4 Depicts how the primary color keys; red, blue, and yellow would create the secondary colors; orange, purple, and green when "mixing" or holding down the color keys. Shows how when holding down the red and yellow keys would create an orange color character, how when holding down the blue and red keys would create the purple color character, and when holding down the yellow and blue keys would create the green color character.

The new color keys on the keyboard, known as primary colors; red, blue, and yellow can be typed together to create new and different colors. These new colors would be: purple, orange, and green. (FIG. 4) These colors are known as secondary colors. How to get the new colors is the trick. A computer operator would have to hold down two of the primary color keys with two fingers at the same time to the count of 1-2 to create the new secondary color. For example: the red and the blue keys when held down together by two fingers to the count of 1-2 would create a purple color. The red and the yellow keys when held down together with two fingers to the count of 1-2 would create an orange color. The blue and the yellow keys when held down together with two fingers to the count of 1-2 would create a green color. (FIG. 4) Dexterity is needed by the computer operator at this time especially when they want to create the secondary colors. They would have to hold down an alphabetical, numerical, or alpha character first with the left hand and then hold down two of the color keys with two fingers on the right hand to the count of 1-2. The original black mark of the alphabetical, numerical, or alpha character would then become a secondary color; purple, orange or green character.

The primary and secondary colors and their derivatives are known as the Color Theory in the visual arts. The theory first appeared in the writings of Leorne Battisa Alberti in 1435 and by the more recognizable known artist, Leonardo de Vinci in 1940, along with Sir Issac Newton in 1704. Albert Munsell published the *Munsell Book of Color* in 1915 as well as Wilhelm Ostald in the *Color Atlas* in 1919. Teachers at the Bauhaus school in Germany in the 20th century made further advances. Modern artists such as Wassily Kandinsky and Josef Albers use the Color Theory in their works.

Using the Color Theory is the primary focus of the invention. The primary and the secondary colors that were first discussed in 1435 are, today, now being used for the computer age. The colors; red, blue and yellow, black and white can be placed on a computer keyboard. (FIG. 1) These colors can then be combined with the alphabetical, numerical, and alpha characters to create complex passwords. The characters that are created by the use of the color keys can ward off offenders.

Figure 9:
FIG. 9 Depicts an example of when the key is typed or held down with letters, numbers and alpha characters keys and the red key at the same time makes the resulting red character. It also shows a letter key and a black key, an alpha character and a white key and their resulting characters.
Figure 9:
Figure 9:
Figure 9:
Figure 9:

For example: a computer operator could hold down the letter "e" first and then hold down the red key to the count of 1-2. The mark in the password system would be a red "e". (FIG. 9) The same can be done for numbers too. A computer operator can hold down a "3" first and then hold down the red key to the count of 1-2 to create a red "3". (FIG. 9) An alpha character like the "#" sign could be held down and then the computer operator can hold down the red key for a count of 1-2 to create a red "#" sign. (FIG. 9)

Figure 10:
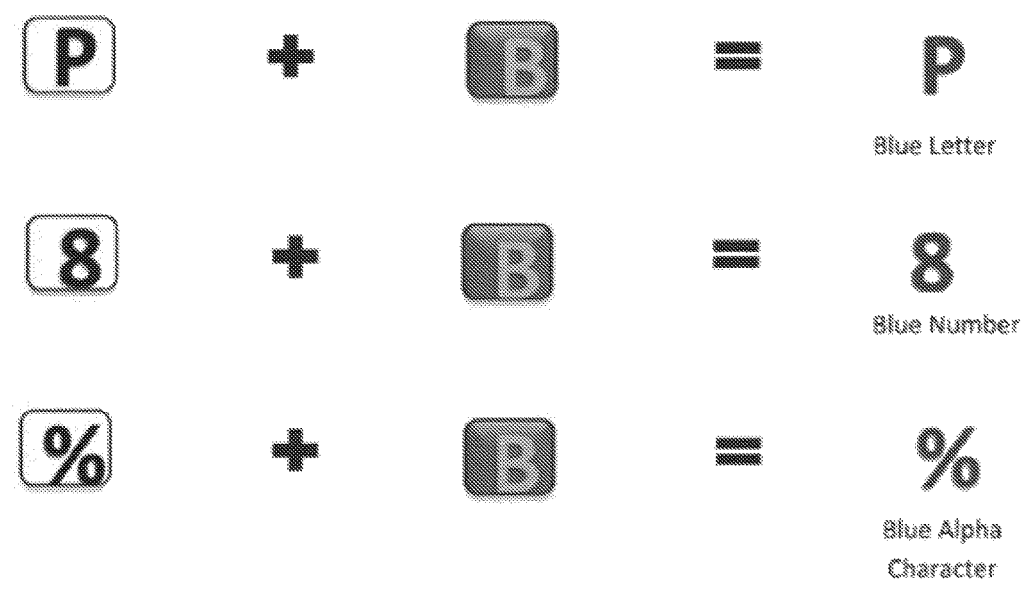

The number "8" when held down with the color blue key at the same time to the count of 1-2 is shown in (FIG. 10). A yellow "*" is shown to depict the action when a yellow key is held down at the same time with the number "*" and held down to the count of 1-2. (FIG. 11)

If the computer operator wants a secondary color like purple, to make a colored character such as a purple "C" he or she can hold down a "C" key with the left hand and the two primary colors, red and blue, with the right hand at the same time to the count of 1-2. This would create a purple "C" character. (FIG. 13) Using this combination makes for a more complex use for creating a password.

Another secondary color can be made by holding down to the count of 1-2 the red and the yellow keys to create an orange color. For example; typing the number "6" and then holding down the red and yellow keys at the same time to the count of 1-2 would create an orange "6" character. (FIG 13)

The alpha character such as the "#" sign could be typed with the left hand and the two color keys, blue and yellow, could be held down to the count of 1-2 with two fingers from the right hand to create a green "#" character. (FIG. 13)

To create secondary colors that are dark in nature the operator would have to hold down two primary keys; red, blue, or yellow, to create the secondary color while holding down the black key to create purple, dark orange and dark green character. This would entail using three fingers to hold down two of the primary keys along with the black key to the count of 1-2.

Figure 5:
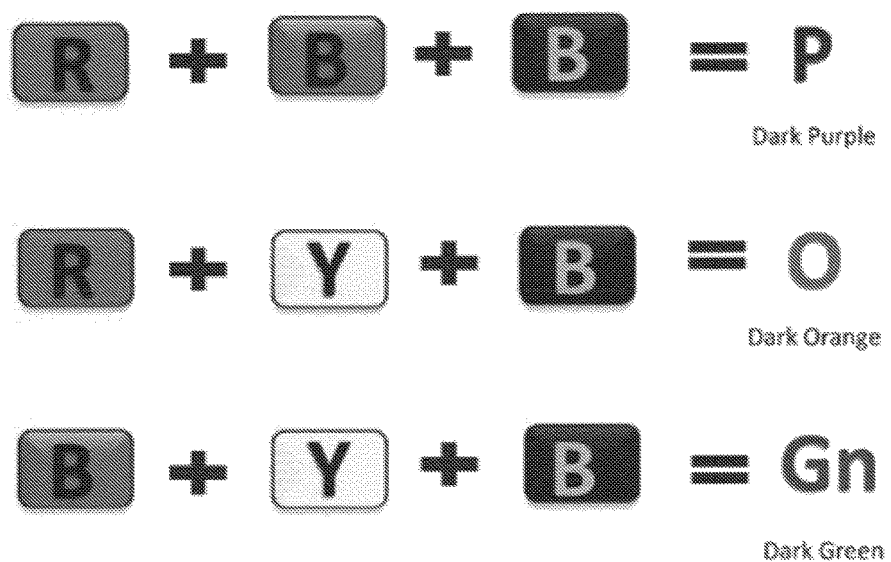
FIG. 5 Depicts how the secondary colors that are made by holding down the keys of the primary color keys that are the result of holding down the red and blue keys to make purple, red and yellow keys to make orange and blue and yellow keys to make green, create; purple, orange, and green characters respectively are shown with the black key that create, when holding down all three keys, a dark purple, a dark orange, and a dark green color character.
Figure 14:
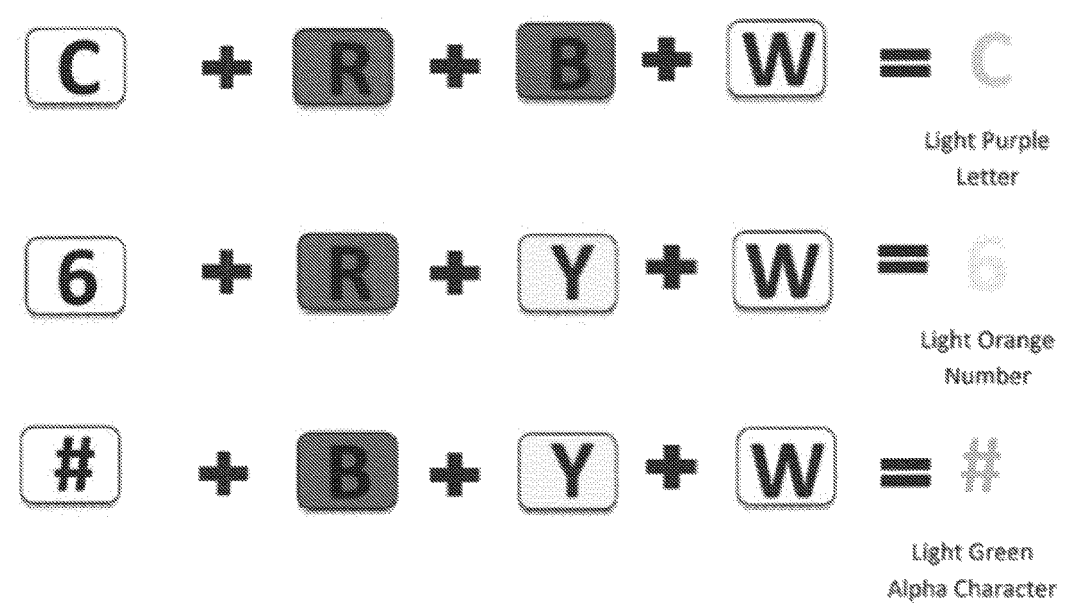

When one or two primary colors, and achromatic color; black or white, are held down to the count of 1-2 the create more characters. The letters, numbers and alpha characters can create lighter and darker shades of characters when holding down the two primary keys and the black or the white key at the same time to the count of 1-2. (FIG. 5) (FIG. 6) (FIG. 14) (FIG. 15) The result would be a confusing set of characters that would create a more secure password.

The achromatic colors, black and white, can create darker and lighter colors also. First, the color gray can be created by holding down the black and the white keys together with two fingers to the count of 1-2. (FIG. 8) Also, the black key could be held down while holding down the primary color keys; red, blue, or yellow keys with two fingers to the count of 1-2 to create dark red, dark blue, and dark yellow. (FIG. 7)

The red key and the black key when held down together to the count of 1-2 would create a dark red character. (FIG. 7) The yellow and the black key when held down at the same time to the the count of 1-2 would create a dark yellow character and the blue key when held down with the black key at the same time to the count of 1-2 would create a dark blue character. (FIG. 7)

Creating secondary colors with the primary keys and with the achromatic keys; black and white, would be a little bit harder. It would entail holding down three keys to create dark or light colors. For instance, when holding down the red and blue and black keys with three fingers to the count of 1-2 a dark purple character would be the result. In (FIG. 15) a purple "C" would be the character that is created. When the red and yellow key are held down with the black key to the count of 1-2 while holding down the number "6" a dark orange "6" character would be created. Also, when the blue and yellow color keys are held down with the black key using three fingers to the count of 1-2 while typing the "#" sign would create a dark green "#". (FIG. 15)

The two primary colors that create the secondary colors would have to be held down with the white key at the same time with three fingers to the count of 1-2 to create light purple, light orange and light green.

When the red key is held down at the same time with the white key to the count of 1-2 a light red character would be created. (FIG. 8) when the yellow key is held down with the white key at the same time to the count of 1-2 a light yellow character is created and when the blue key is held down at the same time as the white key a light blue character would be created (FIG. 8). When the black and the white key are held down together to the count of 1-2 a gray character would be created. (FIG. 8)

The red and blue primary colors keys could be held down together with the white key to the count of 1-2 to create a light purple character. (FIG. 6) The red and the yellow primary color keys could be held down with the white key to create a light orange character. (FIG. 6) And the blue and the yellow color keys when held down with the white key would create a light green character. (FIG. 6)

An example, in use, would be (FIG. 14) when a light purple 'C', a light orange "6", and a light green "#" sign are shown.

A password does not necessarily have to be all in color. Black and white characters can be created when just holding down either one of them to the count of 1-2. (FIG. 12). A black "a" as shown in (FIG. 9) can be used for the password while a "$" can be typed with the white key. Also the black characters on the keyboard can be typed as usual. This would make the password even more complex.

An example of a complex password is shown in (FIG. 12) It shows a red "F", and a blue "5", a yellow "!", a black "9" a white 9" and a gray "$" in primary and achromatic colors.

Another password example is (FIG. 16) It shows how the color keys and the alphabetical, numerical, and alpha character keys can create a complicated series of characters and how they can be transformed in a password.

Any password could be created by typing primary colors, secondary colors, achromatic colors and the alphabet, numbers and alpha characters all together to the count of 1-2.

The complex nature of the colored passwords can be used, especially, by corporations, financial institutions, and governments on a time-based system. For instance, a computer program could be written to have the colored characters change every so often according to the clock to confuse unscrupulous activity.

REFERENCE TO SEQUENCE LISTING, A TABLE, OR A COMPUTER PROGRAM LISTING COMPACT DISC APPENDIX

"Not Applicable"

The invention claimed is:

1. A method of setting a password comprising:
creating a password by:
engaging, by a user, a key of an input device, the key having a native function that is associated with a first color;
simultaneously engaging, by the user, a key of the input device that is associated with one of a letter, a number, and a special character;
assigning, by a computerized device that is in electronic communication with the input device, the first color to the one of the letter, the number and the special character;
displaying, by the computerized device, the one of the letter, the number, and the special character in the first color of the key associated with the color that was engaged by the user;
storing, by the computerized device, the one of the letter, the number, and the special character with an association to the first color; and
repeating the previous steps using the first color and an additional key having a native function associated with an additional color until a string comprising at least one of letters, numbers, and special characters is formed, the string comprising a password.

2. The method of claim 1, wherein the first color and the additional color are different primary colors.

3. The method of claim 1, wherein the additional color is a secondary color.

4. The method of claim 1, wherein the first color is white or black.

5. The method of claim 1, wherein the additional color is a lighter shade of another color when the first color is white.

6. The method of claim 1, wherein the additional color is a darker shade of another color when the first color is black.

7. The method of claim 1, further comprising:
simultaneously engaging, by the user, a plurality of keys of the input device, each key of the plurality of keys being associated with a different color;
assigning, by the computerized device, a combined color to the one of the letter, the number, and the special character, the combined color comprising a combination of the colors associated with each key among the plurality of keys engaged by the user; and
displaying, by the computerized device, the one of the letter, the number, and the special character in the combined color.

8. A method of setting a password comprising:
creating a password by:
engaging, by a user, a key of an input device, the key associated with a first color;
simultaneously engaging, by the user, a key of the input device that is associated with one of a letter, a number, and a special character;
assigning, by a computerized device that is in electronic communication with the input device, the first color to the one of the letter, the number, and the special character;
displaying, by the computerized device, the one of the letter, the number, and the special character in the first color of the key associated with the color that was engaged by the user;
storing, by the computerized device, the one of the letter, the number, and the special character with an association to the first color; and
repeating the previous steps using the first color and one or more additional keys each associated with a unique additional color until a string comprising at least one of letters, numbers, and special characters is formed, the string comprising a password.

9. The method of claim 8, further comprising:
simultaneously engaging, by the user, the first key and at least one of the one or more additional keys of the input device;
assigning, by the computerized device, a combined color to the one of the letter, the number, and the special character, the combined color comprising a combination of the colors associated with the first key and the at least one of the one or more additional keys engaged by the user; and
displaying by the computerized device, the one of the letter, the number, and the special character in the combined color.

10. The method of claim 9, wherein the first color and the unique additional color are different primary colors.

11. The method of claim 9, wherein the combined color is a secondary color.

12. The method of claim 9, wherein the first color is white or black.

13. The method of claim 12, wherein the combined color is a lighter shade of the unique additional color when the first color is white.

14. The method of claim 12, wherein the third color is a darker shade of the unique additional color when the first color is black.

15. The method of claim 9, wherein the first color is white, the unique additional color is black, and the combined color is gray.

* * * * *